(12) United States Patent
Schmitt et al.

(10) Patent No.: US 6,402,247 B1
(45) Date of Patent: Jun. 11, 2002

(54) MULTI-ANGLE SEAT BACK FOR A BOAT HELM STEERING SEAT

(76) Inventors: Gervase A. Schmitt, 1109 Hempfield Dr.; John L. Conroy, II, 57 Silver Mine Rd., both of Lancaster, PA (US) 17601

( * ) Notice: Subject to any disclaimer, the term of this patent is extended or adjusted under 35 U.S.C. 154(b) by 0 days.

(21) Appl. No.: 09/561,548

(22) Filed: Apr. 28, 2000

Related U.S. Application Data

(60) Provisional application No. 60/131,518, filed on Apr. 29, 1999.

(51) Int. Cl.[7] .................................................. B60N 2/20
(52) U.S. Cl. ...................................................... 297/357
(58) Field of Search ......................................... 297/357

(56) References Cited

U.S. PATENT DOCUMENTS

| | | | | |
|---|---|---|---|---|
| 312,775 A | * | 2/1885 | Walker et al. | 297/357 X |
| 429,956 A | * | 6/1890 | Reich | 297/357 X |
| 434,193 A | * | 8/1890 | Mills | 297/357 |
| 668,489 A | * | 2/1901 | Collignon | 297/357 X |
| 679,312 A | * | 7/1901 | Harmon | 297/357 X |
| 712,924 A | * | 11/1902 | Geyer | 297/357 X |
| 714,675 A | * | 12/1902 | Clingman | 297/357 |
| 778,526 A | * | 12/1904 | Bennett | 297/357 X |
| 813,799 A | * | 2/1906 | Hunzinger | 297/357 X |
| 1,005,064 A | * | 10/1911 | Palmer | 297/357 X |
| 1,652,165 A | * | 12/1927 | Craven | 297/357 X |
| 1,922,418 A | * | 8/1933 | Conant | 297/357 |
| 2,310,346 A | * | 2/1943 | Bell | 297/357 X |
| 2,486,716 A | * | 11/1949 | Kuebler | 297/357 |
| 2,603,275 A | * | 7/1952 | Kuebler | 297/357 X |
| 3,076,628 A | * | 2/1963 | Smith et al. | 297/357 X |
| 3,594,040 A | * | 7/1971 | Monroe | 297/357 |
| 3,656,728 A | * | 4/1972 | Griggs | 297/357 X |
| 4,475,770 A | * | 10/1984 | Persons, Jr. | 297/357 X |
| 4,525,009 A | * | 6/1985 | De La Sota Martinez | 297/357 X |
| 6,102,479 A | * | 8/2000 | Wallace | 297/357 |

FOREIGN PATENT DOCUMENTS

| | | | | |
|---|---|---|---|---|
| DE | 1430933 | * | 10/1968 | 297/357 |
| FR | 973505 | * | 2/1951 | 297/357 |
| FR | 1115933 | * | 5/1956 | 297/357 |
| GB | 21570 | * | 9/1911 | 297/357 |
| GB | 217034 | * | 4/1930 | 297/357 |

* cited by examiner

*Primary Examiner*—Milton Nelson, Jr.
*Assistant Examiner*—Rodney B. White

(57) ABSTRACT

A boat helm steering seat includes a multi-angle positionable seat back in which the seat back frame is pivotally connected to the frame of the seat by a pivotal connection that includes a clevis having a stem that slidably supports the vertically oriented legs of the seat back frame. A pivot control mechanism formed as laterally opposed sector plates having an arcuate slot with a center of curvature at the pivotal connection between the seat and seat back frames. Pins projecting outwardly from the seat back legs are engageable with notches formed in the sector plates extending downwardly from said arcuate slot to correspond to pre-selected pivoted positions of the seat back. Pivotal movement of the seat back is accomplished by vertically lifting the seat back to effect a sliding movement over the stems of the clevises and re-positioning the pins on the seat back legs into the notch corresponding to the position desired for the seat back. The sector plate preferably has three or five notches, including a center notch corresponding to an upright position of the seat back.

15 Claims, 4 Drawing Sheets

MULTI-ANGLE SEAT BACK FOR A BOAT HELM STEERING SEAT

CROSS-REFERENCE TO RELATED APPLICATIONS

This application claims domestic priority on U.S. Provisional Patent Application Serial No. 60/131,518, filed Apr. 29, 1999, the contents of which are incorporated herein by reference.

BACKGROUND OF THE INVENTION

This invention relates generally to a seat for use on a boat and, more particularly, to an apparatus for positioning the seat back in one of a plurality of selectable positions.

Adjustable-backed, bench-type seats are frequently used on boats at a number of locations, but particularly at the boat helm, the operator's control station. An adjustable back is one in which the generally vertical seat back is movable from a first position in which the seat back is inclined slightly to vertical and located at one side of the bench seat to a second position which is essentially a mirror image of the first position, which would enable the seat to be utilized in substantially the opposite orientation. Other adjustable seat backs can be positioned in a mid-range, generally vertical orientation to provide a back rest, a seat leaning post, for the boat operator to operate the boat controls from a standing position, leaning back against the generally vertical seat back.

Known prior art adjustable seat backs for boat seats include a locking device in which the seat back frame is provided with an enlarged portion that can be lifted vertically and relocated into another horizontally disposed socket within a generally horizontally disposed bracket to restrain the pivotal movement of the seat back frame. In this known prior art configuration, the seat back frame is mounted to a pivot device fixed to the seat frame at a central location and the seat frame is vertically movable relative to the pivot device to effect a disengagement of the enlarged portion of the seat back frame from the corresponding socket in which it has been secured. A re-positioning of the seat back to the desired configuration and a subsequent lowering of the seat back frame on the pivot device locks the seat back into the selected position.

It would, therefore, be desirable to provide an apparatus to improve the operation of an adjustable backed boat seat to permit a re-positioning of the seat back into one of a plurality of selected positions with a minimum of effort.

SUMMARY OF THE INVENTION

It is an object of this invention to provide a boat helm steering seat with a multi-angle positionable seat back which can be quickly and easily moved from one desired position to another.

It is another object of this invention to provide a pivotal seat back for a boat helm steering seat that can be easily moved from one pivoted position to another.

It is a feature of this invention that the seat back is formed with generally vertically extending legs that are slidably supported on a pivot mechanism interconnecting the seat frame and the seat back frame.

It is another feature of this invention that the pivotal movement of the seat back is restricted by a pivot control mechanism that positions the seat back in one of several pre-selected seat back angles.

It is an advantage of this invention that the seat back can be re-oriented into a desired position by vertically moving the seat back on the pivot mechanism and repositioning the seat back about its pivot on the seat frame.

It is still another feature of this invention that the pivot control mechanism includes a pair of laterally opposed sector plates having an arcuate slot centered on the pivot between the seat frame and the seat back frame and a plurality of downwardly extending notches engageable with a pin projecting outwardly from the seat back legs.

It is still another object of this invention to provide a boat helm steering seat with a pivoted multi-angle positionable seat back that is durable in construction, inexpensive of manufacture, carefree of maintenance, facile in assemblage, and simple and effective in use.

These and other objects, features and advantages are accomplished according to the instant invention by providing a boat helm steering seat having a multi-angle positionable seat back in which the seat back frame is pivotally connected to the frame of the seat by a pivotal connection that includes a clevis having a stem that slidably supports the vertically oriented legs of the seat back frame. A pivot control mechanism formed as laterally opposed sector plates having an arcuate slot with a center of curvature at the pivotal connection between the seat and set back frames. Pins projecting outwardly from the seat back legs are engageable with notches formed in the sector plates extending downwardly from said arcuate slot to correspond to pre-selected pivoted positions of the seat back. Pivotal movement of the seat back is accomplished by vertically lifting the seat back to effect a sliding movement over the stems of the devises and re-positioning the pins on the seat back legs into the notch corresponding to the position desired for the seat back. The sector plate preferably has three or five notches, including a center notch corresponding to an upright position of the seat back.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
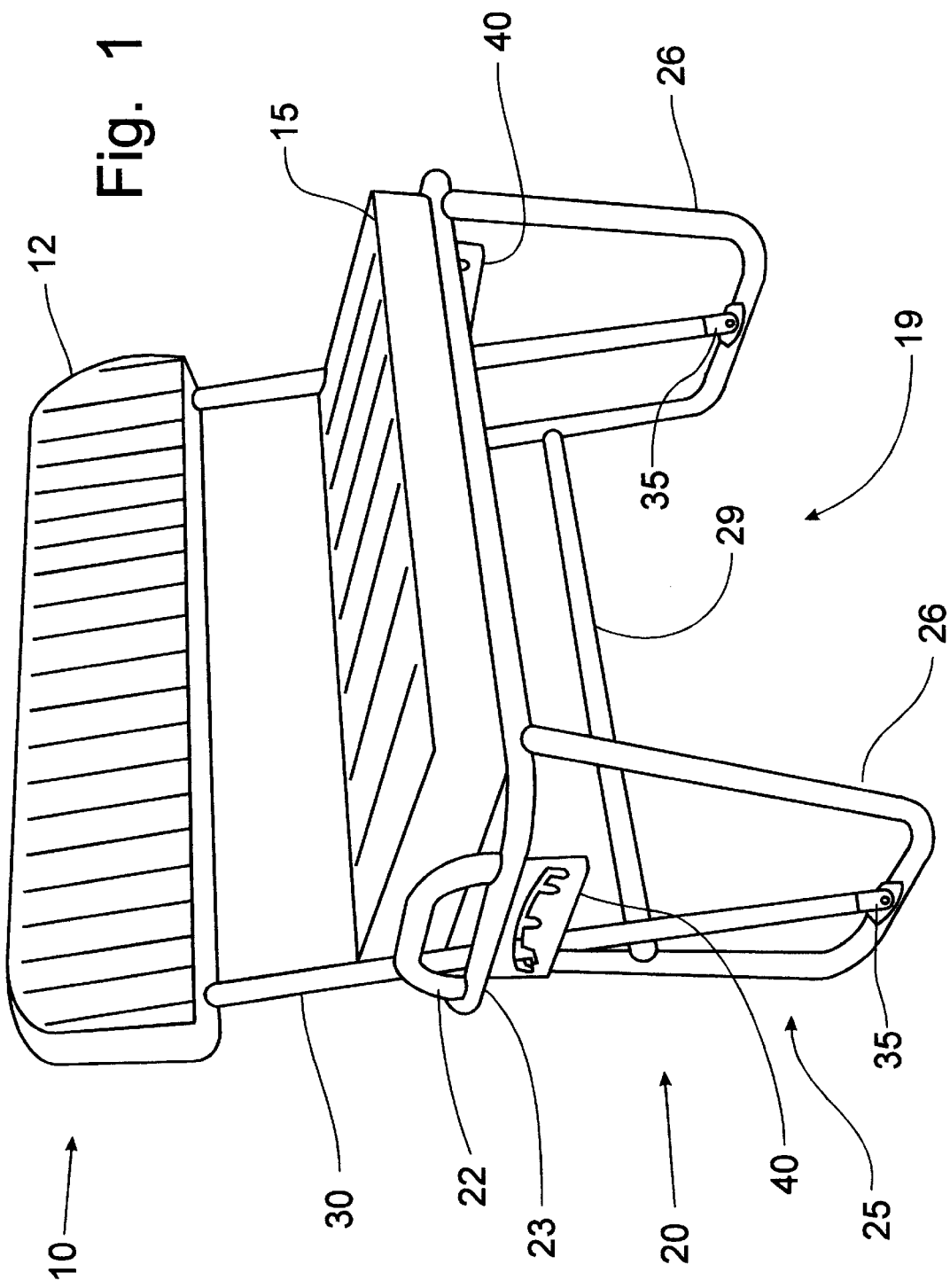
FIG. 1 is a front, right side perspective view of a steering seat for a boat helm incorporating the principles of the instant invention the seat cushion and cushioned back rest are mounted on the seat back frame, the back rest being positioned in a rearward position so as to provide a typical boat helm seat.

Referring now to FIG. 1, a bi-directional, multi-angle steering seat for a boat helm can best be seen. All references to left, right, front and rear are determined by standing behind the steering seat 10 shown in FIG. 1 and facing the steering seat 10, such that the cross brace member 29 is at the rear of the steering seat 10. The seat back 12 is selectively positionable in a multiple of orientations as will be described in greater detail below. The front portion of the steering seat 10 is open so that a standard cooler (not shown) will fit beneath the seat cushion 15 and be restrained from moving rearwardly from the steering seat structure 10 by the cross brace member 29. While the preferred use of the steering seat 10 is at the boat helm (not shown) to provide a support for the operator of the boat at the controls therefor, the steering seat 10 can be located on other portions of the boat as well for seating by passengers.

Figure 2:
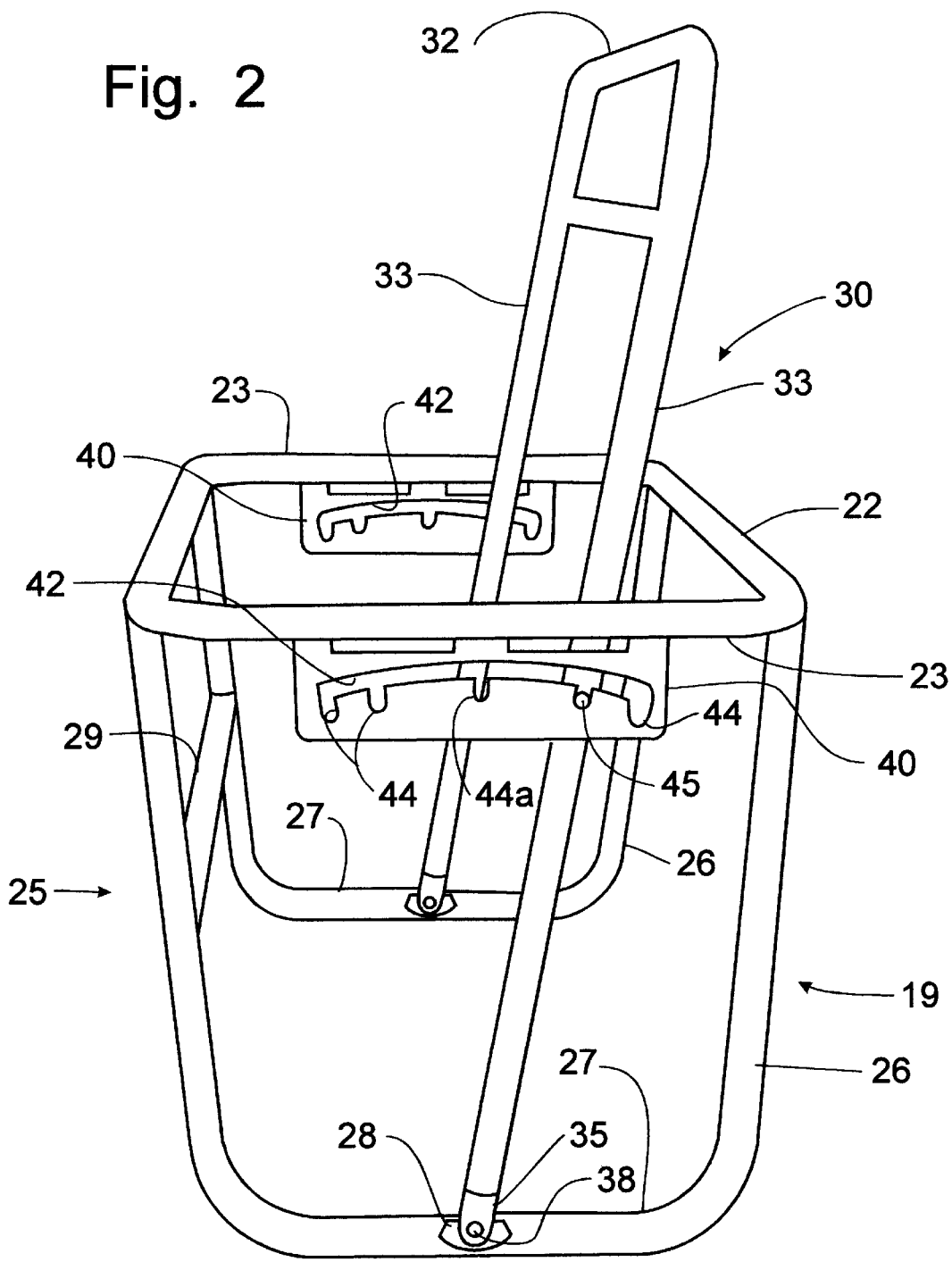
FIG. 2 is a right side perspective view of the seat frame of the steering seat shown in FIG. 1, the seat and back rest cushions being removed for purposes of clarity, the seat back frame being positioned in a forward orientation to that shown in FIG. 1 so as to provide a typical seat facing away from the boat helm.
Figure 3:
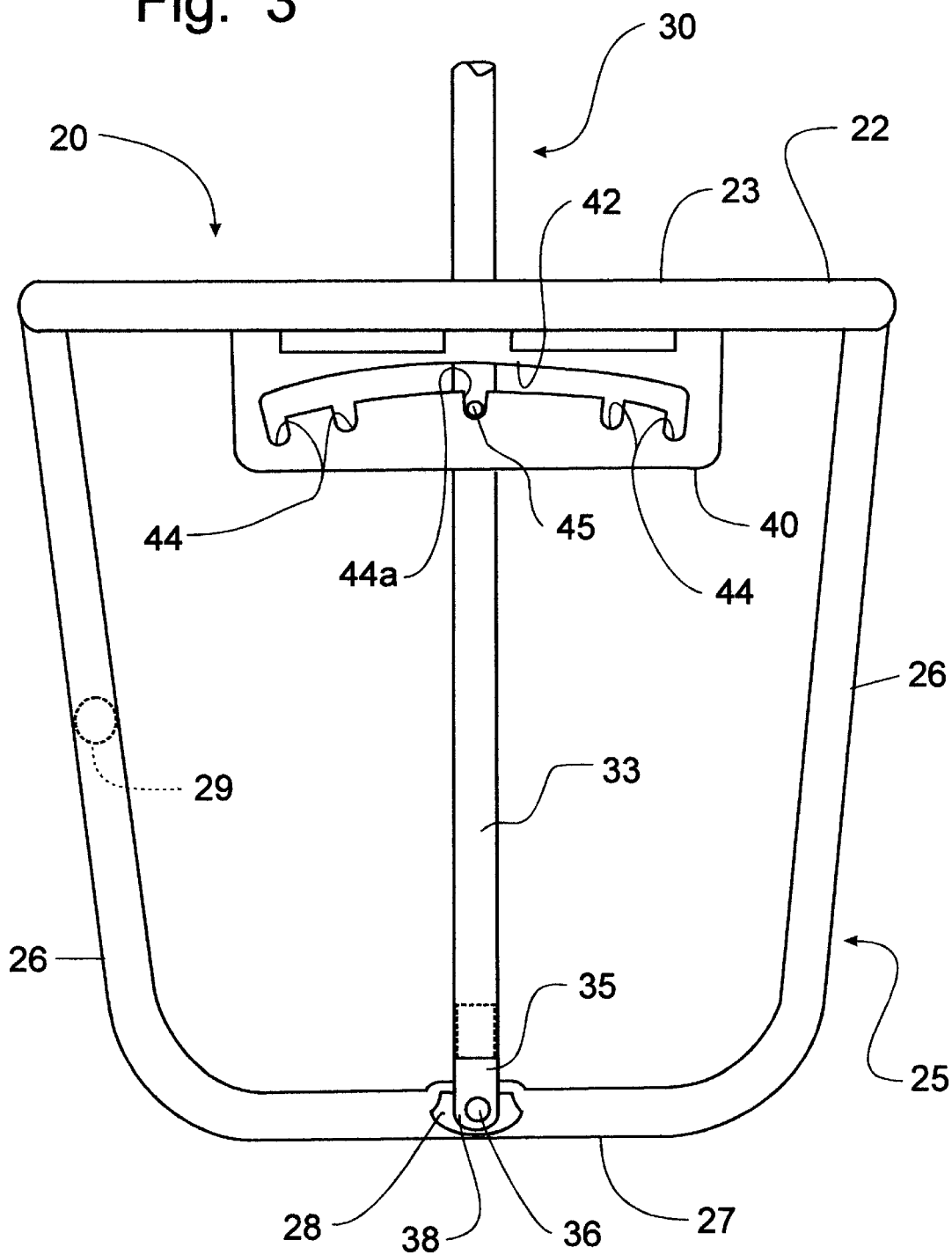
FIG. 3 is an enlarged partial right side elevational view of the seat frame shown in FIG. 2 with the seat back frame being positioned in a vertical orientation to provide a back support for a standing person to lean against.

Referring now to FIGS. 2 and 3, the details of the frame 20 of the steering seat 10 can best be seen. The frame 20 is preferably formed from metal tubes, such as aluminum or stainless steel; however, a number of other materials can be utilized as well, including fiberglass, plastic, polymer composites and even wood. The frame 20 includes a generally rectangular upper seat support member 22 having side members 23 oriented generally horizontally and being supported in an elevated position to locate the seat cushion 15 above the boat deck 19 by a support frame portion 25. The support frame portion 25 is formed from U-shaped left and right, laterally spaced leg members 26 with the bight portions 27 thereof connected, such as by welding, to the upper seat support member 22. The cross brace member 29 adds rigidity to the frame structure 20 and serves as a stop for any cooler (not shown) placed underneath the seat cushion 15 to prevent the cooler from moving rearwardly of the seat 10. The seat frame 20 is mountable to the boat deck 19 in any one of a number of customary manners, such as by connecting the leg members 26 to brackets (not shown) fixed to the boat deck 19.

Figure 5:
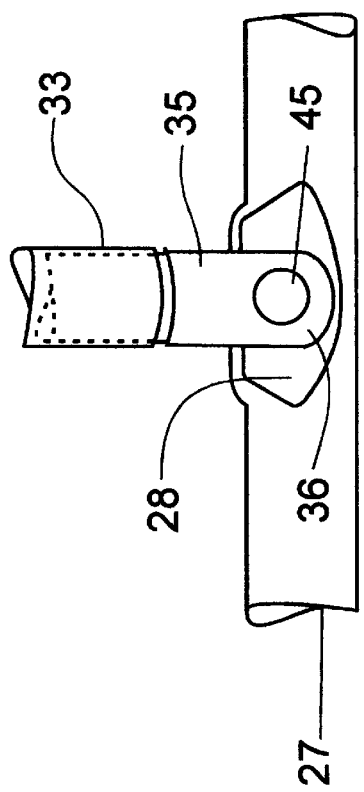
FIG. 5 is an enlarged side elevational view of the pivotal connection of the seat back frame to the seat frame with the seat back frame being oriented in the position shown in FIGS. 3 and 4.

Referring now to FIGS. 1–3 and 5, the seat back frame 30 is formed preferably from a U-shaped piece of tubular stock that is oriented in an inverted manner such the bight portion 32 of the U-shape is located at the top of the seat back frame 30. The leg portions 33 of the seat back frame 30 extend downwardly from the bight portion 32 for pivotal connection to the leg members 26. The bight portion 27 of each leg member 26 is formed with a flattened connection portion 28 to mount the corresponding leg portion 33 of the seat back frame 30. As best seen in FIG. 5, a clevis 35 having a yoke portion 36 pivotally connects each of the flattened connection portions 28 by a pivot pin or bolt 38, with the yoke portion 36 being located on either side of the corresponding flattened connection portion 28. The stem portion of each clevis 35 is received within the hollow tube of the corresponding leg portion 33 in a sliding relationship therewith. In configurations in which a separate frame 20 is not provided as or similar to that described above, the clevis 35 can be pivotally attached to a bracket affixed to the boat.

Figure 4:
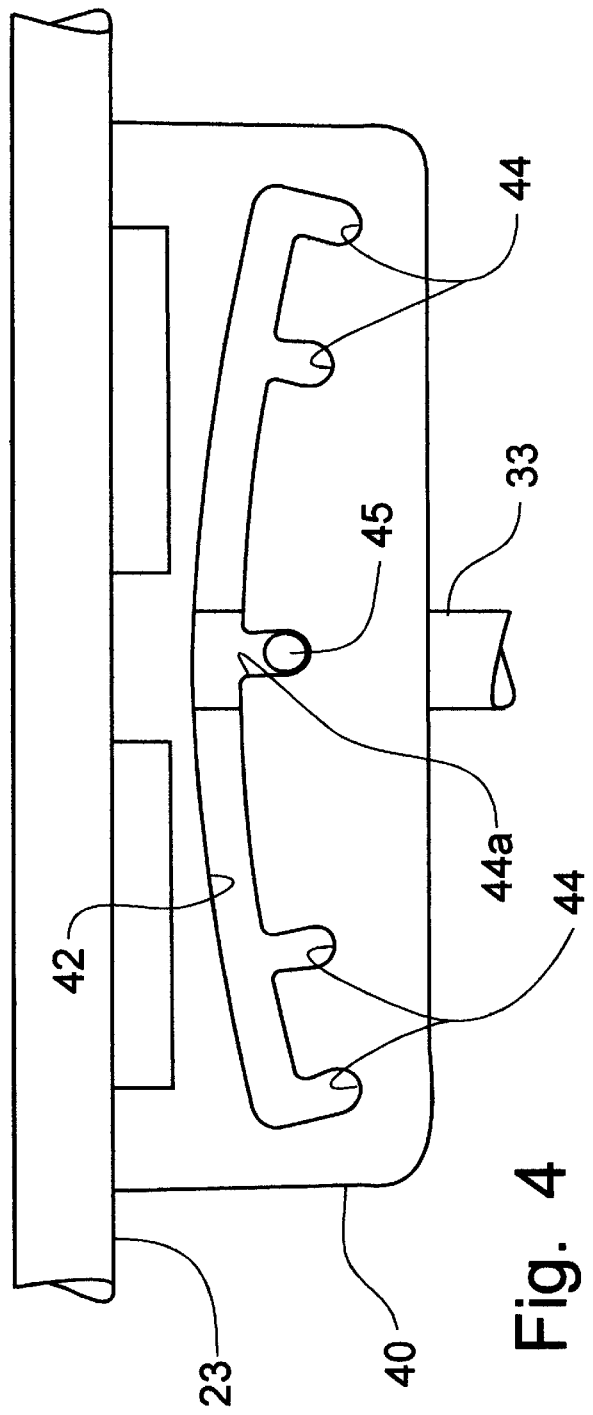
FIG. 4 is an enlarged side elevational view of the sector plate portion of the seat frame used to lock the seat back frame into a selected position, corresponding to the position shown in FIG. 3.

As best seen in FIGS. 2–4, the upper seat support member 22 is provided with a vertically oriented sector plate 40 on each respective side member 23 to be located adjacent the leg portion 33 of the seat back frame 30. Each sector plate 40 is connected to the corresponding side member 23, such as by welding or alternatively via mounting or a bracket or the like, and is formed with an arcuate slot 42 having a center of curvature corresponding to the pivot connection between the clevis 35 and the leg portion 33 of the support frame portion 25. The arcuate slot 42 is formed with a number of notches 44 that depend downwardly from the arcuate slot 42 and correspond to desired pivoted positions of the seat back 12 relative to the seat cushion 15. Preferably, five such notches 44 are provided including a center notch 44*a*, corresponding to a central vertical position for the seat back 12, and two notches to either side of the center notch 44*a* to correspond to increasingly inclined positions of the seat back 12 to either side of the central position. Alternatively, other notch configurations can be provided, such as three or seven notches, depending on the number of selectable positions that are desired for the seat back 12.

Each leg portion 33 of the seat back frame 30 is provided with an outwardly projecting pin 45, which could be manufactured in the form of a rod or a bolt, located to communicate with the corresponding arcuate slot 42 in the sector plate 40 adjacent thereto. The pin 45 and the notches 44 are sized to permit the pin 45 to be retained within any selected one of the notches 44. The placement of the pin 45 within one of the notches, fixes the seat back 12 in the selected desired position. To move the pin 45 out of the notch in which the pin 45 is engaged, the seat back frame 30 is physically moved upwardly to effect a vertical movement of the leg portion 33 relative to the stem of the clevis 35 upon which the seat back frame 30 is supported for pivotal movement relative to the leg members 26 of the upper seat support member 32. The amount of vertical movement of the seat back frame 30 on the stem of the clevis 35 is a function of the vertical height of the arcuate slot 42 from the bottom of the notch 44. Since the sector plate 40 captures the pin 45, the amount of movement of the seat back frame 30, whether pivotally moved with the clevis 35 or vertically moved relative to the clevis 35, is controlled by the size and shape of the arcuate slot 42.

In operation, the operator, desiring to change the orientation of the seat back 12, can grasp the seat back 12 and lift upwardly to move the leg portions 33 generally vertically on the stems of the respective devises 35 and, thereby, clear the pin 45 from the notch 44 in which the pin 45 is presently engaged. The operator can then pivotally move the seat back, the pivotal movement occurring between the devises 35 and the flattened connection portion 28 of the leg members 26, to the desired position with the pin 45 aligned over one of the selectable notches 44 and then force the seat back 12 back down on and relative to the stems of the devises 35 to re-engage the pin 45 into the selected notch 44.

In the way of a specific example, the operator, starting with the seat back 12 in the center position with the pin 45 engaged within the central notch 44*a*, as demonstrated in FIGS. 3 and 4, will lift the seat back 12 to clear the pin 45 from the center notch 44*a* and then pivotally rotate the seat back to a desired position, such as the first inclined position as shown in FIG. 1. The operator would then lower the seat back 12 on and relative to the clevis stems to re-engage the pin 45 into the selected first notch most rearward from the central notch 44*a*. The operator, therefore, in a quick and convenient manner can convert the orientation of the steering seat into the desired configuration with little effort. The operator does not have to align enlarged parts with corresponding enlarged sockets in a restraining plate, and can quicky and easily convert the steering seat from one configuration to another with a minimum of inconvenience.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A boat seat comprising:
    a seat frame having a lower first portion oriented to support said frame on a boat deck and an elevated second portion oriented to support a seat cushion in a position elevated above said boat deck;
    a seat back frame pivotally connected to said seat frame to be pivotally movable in a fore-and-aft direction, said seat back frame supporting a seat back cushion at a position elevated above said seat cushion so that said seat back cushion would be pivotally movable above said seat cushion, said seat back frame including a pair of downwardly extending legs;
    a pivot mechanism interconnecting said seat back frame and said seat frame to provide the pivotal connection therebetween, said pivot mechanism being slidably engageable with said downwardly extending legs such that said seat back frame is generally vertically movable with respect to said pivot mechanism, said pivot mechanism including a clevis pivotally attached to said seat frame at each laterally opposing side of said seat frame, each said clevis having a stem extending into a hollow portion of the corresponding said seat back frame leg, so that said legs are generally vertically movable on said clevis stems; and
    a pivot control apparatus mounted to said seat frame adjacent to said seat back frame for selectively limiting the pivotal movement of said seat back frame.

2. The boat seat of claim 1 wherein said pivot control apparatus includes a sector plate affixed to said elevated second portion of said seat frame, said seat back frame including a pin projecting outwardly therefrom to be engageable with said sector plate, said sector plate having a plurality of notches formed therein to be engageable by said outwardly projecting pin.

3. The boat seat of claim 2 wherein said pivot control apparatus includes a sector plate on each laterally opposed side of said seat frame, each said downwardly extending leg of said seat back frame having one of said pins extending outwardly therefrom for engagement with a corresponding one of said sector plates.

4. The boat seat of claim 3 wherein said sector plates are formed with an arcuate slot having a center of curvature located approximately at the pivotal connection between said seat frame and said seat back frame, said notches being formed in said sector plates downwardly from said arcuate slot, the generally vertical sliding movement of said seat back frame relative to said pivot mechanism permitting said pins to move from a selected one of said notches into said arcuate slot to be re-located into another one of said notches to change the position of said seat back cushion relative to said seat cushion.

5. The boat seat of claim 1 wherein said seat frame and said seat back frame are formed of hollow tubing, each said laterally opposing side of said lower first portion of said seat frame having a centrally located flattened portion for attachment to the corresponding said clevises by a pivot pin extending through the corresponding clevis and flattened portion of said seat frame.

6. The boat seat of claim 5 wherein each said sector plate has at least three notches formed therein, including a center notch corresponding to a generally vertical orientation of said seat back cushion relative to said seat cushion.

7. In a boat seat having a seat frame including a lower first portion oriented to support said frame on a boat deck and an elevated second portion oriented to support a seat cushion in a position elevated above said boat deck; and a seat back frame connected to said seat frame to support a seat back cushion at a position elevated above said seat cushion, said seat back frame including a pair of vertically extending legs, the improvement comprising:
    a pivot mechanism interconnecting said seat back frame and said seat frame to provide a pivotal connection therebetween, said pivot mechanism being slidably engageable with said vertically extending legs such that said seat back frame is generally vertically movable with respect to said pivot mechanism; and
    a pivot control apparatus mounted to said seat frame adjacent to said seat back frame for selectively limiting the pivotal movement of said seat back frame, said pivot control apparatus permitting said seat back frame to move through a range of positions from a first reclined position on one side of said seat frame to a second reclined position on an opposing side of said seat frame, including a generally vertical position substantially mid-way between said first and second reclined positions.

8. The boat seat of claim 7 wherein said pivot control apparatus includes a pair of laterally opposed sector plates affixed to said elevated second portion of said seat frame, said seat back legs including a pin projecting outwardly therefrom to be engageable with the corresponding said sector plates, each said sector plate having a plurality of notches formed therein to be engageable by the corresponding said outwardly projecting pin.

9. The boat seat of claim 8 wherein said pivot mechanism includes a clevis pivotally attached to said seat frame at each laterally opposing side of said seat frame, each said clevis having a stem extending into a hollow portion of the corresponding said seat back frame leg, so that said legs are generally vertically movable on said clevis stems.

10. The boat seat of claim 9 wherein said seat frame and said seat back frame are formed of hollow tubing, each said laterally opposing side of said lower first portion of said seat frame having a centrally located flattened portion for attachment to the corresponding said clevises by a pivot pin extending through the corresponding clevis and flattened portion of said seat frame.

11. The boat seat of claim 9 wherein said sector plates are formed with an arcuate slot having a center of curvature located approximately at the pivotal connection between said seat frame and said seat back frame, said notches being formed in said sector plates downwardly from said arcuate slot, the generally vertical sliding movement of said seat back frame relative to said pivot mechanism permitting said pins to move from a selected one of said notches into said arcuate slot to be re-located into another one of said notches to change the position of said seat back cushion relative to said seat cushion.

12. A boat helm steering seat comprising:
    a seat frame having a lower first portion oriented to support said frame on a boat deck and an elevated second portion oriented to support a seat cushion in a position elevated above said boat deck, said seat frame having a forward side and a rearward side;
    a seat back frame connected to said seat frame to support a seat back cushion at a position elevated above said seat cushion, said seat back frame including a pair of vertically extending legs;
    a pivot mechanism interconnecting said seat back frame and said seat frame to provide a pivotal connection therebetween, said pivot mechanism being slidably engageable with said vertically extending legs such that said seat back frame is generally vertically movable with respect to said pivot mechanism; and a pair of laterally opposed sector plates affixed to said elevated second portion of said seat frame adjacent said seat back legs, said seat back legs including a pin projecting outwardly therefrom to be engageable with the corresponding said sector plates, each said sector plate having a plurality of notches formed therein to be engageable by the corresponding said outwardly projecting pin, said notches corresponding to at least one angled position of said seat back frame above said forward side of said seat frame, at least one angled position of said seat back frame above said rearward side of said seat frame, and a central generally vertical position.

13. The boat helm steering seat of claim 12 wherein said sector plates are formed with an arcuate slot having a center of curvature located approximately at the pivotal connection between said seat frame and said seat back frame, said notches being formed in said sector plates downwardly from said arcuate slot, the generally vertical sliding movement of said seat back frame relative to said pivot mechanism permitting said pins to move from a selected one of said notches into said arcuate slot to be re-located into another one of said notches to change the position of said seat back cushion relative to said seat cushion.

14. The boat helm steering seat of claim 13 wherein said pivot mechanism includes a clevis pivotally attached to said seat frame at each laterally opposing side of said seat frame, each said clevis having a stem extending into a hollow portion of the corresponding said seat back frame leg, so that said legs are generally vertically movable on said clevis stems.

15. The boat helm steering seat of claim 14 wherein said seat frame and said seat back frame are formed of hollow tubing, each said laterally opposing side of said lower first portion of said seat frame having a centrally located flattened portion for attachment to the corresponding said clevises by a pivot pin extending through the corresponding clevis and flattened portion of said seat frame.

* * * * *